Patented Apr. 30, 1935

1,999,388

UNITED STATES PATENT OFFICE 1,999,388

TREATMENT OF CATALYST MASSES

Walter Bader and Edward Boaden Thomas, Spondon, near Derby, England, assignors to Celanese Corporation of America, a corporation of Delaware No Drawing. Application March 13, 1930, Serial No. 435,631. In Great Britain May 31, 1929

13 Claims. (Cl. 260—116)

This invention relates to the re-activation of catalyst masses which have become fatigued or poisoned in gas reactions. It relates especially to the re-activation of catalysts employed for the synthesis of methanol or other oxygenated organic compounds from mixtures of carbon monoxide and hydrogen or from reactions between carbon monoxide (or mixtures containing carbon monoxide or carbon monoxide and hydrogen) upon vapours of aliphatic alcohols, esters or ethers such for instance as methylalcohol, methyl formate, dimethylether or methylacetate. The invention has particular reference to the activation of certain catalysts termed hereinafter for convenience oxidic catalysts.

By the term oxidic catalysts we mean catalysts composed of or containing one or more metal oxides, basic oxides or acidic oxides. As instances of such catalysts may be mentioned zinc oxide alone or in admixture with metals such as copper or zinc, mixtures of zinc oxide and chromium oxide.

The catalysts employed for the synthesis of oxygenated organic compounds (e. g. from mixtures of gases or vapours comprising carbon monoxide e. g. from mixtures of carbon monoxide and hydrogen) show a gradual decline of activity after a certain working period, and this loss of activity appears to be largely attributable to impurities in the gas mixture, especially to sulphur compounds, or to the accumulation of tarry matter formed from minute amounts of high molecular by-products of the gas reaction.

According to the invention we have found that the catalyst masses, and especially the oxidic catalysts, may be reactivated in a highly satisfactory manner by subjecting them to the action of hydrogen, or of a gas mixture rich in hydrogen, at temperatures not substantially exceeding those employed in the catalytic operation e. g. the synthesis of the oxygenated organic compound or compounds. Preferably the reactivation is performed under pressure.

In performing the invention for the reactivation of catalysts employed for the synthesis of oxygenated organic compounds from gases containing or comprising carbon monoxide and hydrogen, we may employ pure hydrogen or any gas mixtures rich in hydrogen, particularly gas mixtures containing over 75% of hydrogen. Where however a mixture of carbon monoxide and hydrogen is employed for the re-activation such mixture should be richer in hydrogen than that employed for the synthesis of the oxygenated organic compound.

The reactivation of the catalyst can conveniently be performed in the apparatus employed for the synthesis of the oxygenated organic compound or compounds, pure hydrogen or it may be a gas mixture richer in hydrogen being circulated or passed through the apparatus in place of the mixture of carbon monoxide and hydrogen employed for the synthesis; the temperature during the reactivation being preferably kept at or below the temperature employed for the synthesis and the pressure employed for the synthesis being preferably maintained during the reactivation. The activation may in fact readily be performed by temporarily changing the gas supply during the synthesis, a gas richer in hydrogen (or even pure hydrogen) being passed or circulated in place of the normal mixture of CO and H, the temperature and pressure conditions of the synthesis being kept substantially the same during reactivation.

Catalysts reactivated by the process of the invention regain a very substantial amount of their catalytic power, in fact in some cases we have found their catalytic power to be actually superior to the original catalyst.

The reactivation of a mixture of chromium oxide and zinc oxide employed in the synthesis of methanol may be mentioned as an instance of highly useful application of the invention. When employed for the synthesis of methanol from gas mixtures containing traces of sulphur, this catalyst after use for a period of some weeks shows a distinct falling off in catalytic power and is found to have a considerable amount of sulphur in the surface layer. Treatment of this fatigued catalyst with hydrogen or a gas rich in hydrogen (e. g. containing 80 to 90% of hydrogen) in the manner above described quickly restores the catalytic activity. Conveniently the reactivation may be applied to the fatigued catalyst without interrupting the manufacturing operation, the passage of the normal gas mixture (e. g. containing about 66% hydrogen and 33% CO) being temporarily stopped and a gas mixture containing a higher percentage of hydrogen (e. g. about 80 to 90% hydrogen and 10% to 15% CO) being passed in contact or circulated over the catalyst to effect the reactivation, the temperature and pressure conditions during the reactivation being similar to those employed during the synthesis. The catalyst may of course be maintained at the desired temperature during the reactivation by any suitable means. Conveniently in cases where the hot reaction gases serve to supply the heat by heat exchange for the synthesis, the temperature can be maintained during the reactivation by suitable adjustment of the heat exchange devices, as the gases react exothermically, though to a less degree, during the reactivation.

By the simple expedient of changing the gas supply in the manner above described as and whenever the catalyst shows signs of decreased activity, the catalyst can be kept in good condition for very long periods of time without stopping the plant.

The following example serves to illustrate one convenient form of execution of the invention it being understood that it is given only by way of illustration and is in no way limitative.

*Example*

A methanol catalyst consisting of zinc oxide and chromium oxide and employed for the synthesis of methanol from a gas mixture containing 66% hydrogen and 33% CO, at 370° C. and at 100 atmospheres pressure, was found after two months working to synthesize about only ½ the amount of methanol under the same conditions. This catalyst was fully reactivated by treating it for 3 hours with a gas mixture containing 90% hydrogen and 10% CO at 100 atmospheres pressure at 370° C.

In performing the invention for the reactivation of catalysts employed for the synthesis of oxygenated organic compounds from mixtures of aliphatic alcohols, esters or ethers (e. g. methylalcohol, methyl acetate, methyl formate, dimethyl ether) and carbon monoxide (or gases containing the same), the reactivation may be performed by passing in contact with the catalyst pure hydrogen or a gas rich in hydrogen in place of the vapours employed for the synthesis. If mixtures containing hydrogen are employed for the reactivation they should be richer in hydrogen than the vapours employed for the particular synthesis. Conveniently the reactivation may be effected by changing the gas supply and temporarily passing hydrogen or a gas mixture rich in hydrogen over the catalyst in place of the reaction mixture employed for the synthesis, the conditions of temperature and pressure employed for the synthesis being conveniently maintained during the reactivation.

Where vapours alone (e. g. methyl formate) are employed for the synthesis of the oxygenated organic compound the reactivation may be effected by passing hydrogen or a gas mixture rich in hydrogen in contact with the catalyst in place of the vapour submitted to the synthesis, and in this case also the conditions of temperature and pressure employed for the synthesis may conveniently be maintained during the reactivation.

Whilst the process of the invention is especially suitable for the reactivation of oxidic catalysts it may be applied with advantage to the reactivation of any catalysts employed for the synthesis of oxygenated organic compounds.

Whilst the process of the invention may be applied with particular advantage to the re-activation of catalysts employed for the synthesis of oxygenated organic compounds it can be applied to the reactivation of other catalyst masses which have become contaminated or poisoned by sulphur or like impurities.

What we claim and desire to secure by Letters Patent is:—

1. Method of reactivating oxidic catalyst masses used in the production of oxygenated organic compounds from reaction mixtures comprising carbon monoxide as an essential reactant, which comprises subjecting said masses themselves to the action of a gas rich in hydrogen at temperatures not substantially exceeding those employed in the catalytic reaction.

2. Method of reactivating oxidic catalyst masses used in the production of oxygenated organic compounds from reaction mixtures comprising carbon monoxide as an essential reactant, which comprises subjecting said masses themselves to the action of a gas rich in hydrogen at temperatures not substantially exceeding those employed in the catalytic reaction and at substantially the same pressure as that employed in the catalytic reaction.

3. Method of reactivating oxidic catalyst masses used in the production of oxygenated organic compounds from reaction mixtures comprising carbon monoxide as an essential reactant, which comprises subjecting said masses themselves to the action of a gas containing at least 75% hydrogen at temperatures not substantially exceeding those employed in the catalytic reaction.

4. Method of reactivating oxidic catalyst masses used in the production of oxygenated organic compounds from reaction mixtures comprising carbon monoxide as an essential reactant, which comprises subjecting said masses themselves to the action of a gas containing at least 75% hydrogen at temperatures not substantially exceeding those employed in the catalytic reaction and at substantially the same pressure as that employed in the catalytic reaction.

5. Method of reactivating catalyst masses comprising zinc oxide used in the production of oxygenated organic compounds from reaction mixtures comprising carbon monoxide as an essential reactant, which comprises subjecting said masses themselves to the action of a gas containing at least 75% hydrogen at temperatures not substantially exceeding those employed in the catalytic reaction and at substantially the same pressure as that employed in the catalytic reaction.

6. Method of reactivating oxidic catalyst masses used in the production of oxygenated organic compounds from reaction mixtures comprising carbon monoxide and hydrogen, which comprises subjecting said masses themselves to the action of a gas richer in hydrogen than that employed in the catalytic reaction at temperatures not substantially exceeding those employed in the catalytic reaction.

7. Method of reactivating oxidic catalyst masses used in the production of oxygenated organic compounds from reaction mixtures comprising carbon monoxide and hydrogen, which comprises subjecting said masses themselves to the action of a gas, containing at least 75% of hydrogen, and richer in hydrogen than that employed in the catalytic reaction at temperatures not substantially exceeding those employed in the catalytic reaction and under a pressure substantially the same as that employed in the catalytic reaction.

8. In a process for the catalytic production of oxygenated organic compounds from a gas mixture comprising oxides of carbon and hydrogen, the step of passing, intermittently with said gas mixture, a gas richer in hydrogen than said gas mixture in contact with the oxidic catalyst mass employed for the catalytic process at temperatures and pressures not substantially higher than those employed for the catalytic process, for the purpose of reactivating the catalyst.

9. In a process for the production of oxygenated organic compounds from a reaction mixture comprising oxides of carbon and hydrogen, the step of passing intermittently with said gas mixture a gas containing at least 75% hydrogen and richer in hydrogen than said gas mixture in contact with the oxidic catalyst mass employed for the catalytic process at temperatures and pressures substantially the same as those employed for the catalytic process for the purpose of reactivating the catalyst.

10. In a process for the production of oxygenated organic compounds from a reaction mixture comprising oxides of carbon and hydrogen, the step of passing intermittently with said gas mixture a gas containing at least 75% hydrogen and richer in hydrogen than said gas mixture in contact with the zinc oxide containing catalyst mass employed for the catalytic process at temperatures and pressures substantially the same as those employed for the catalytic process for the purpose of reactivating the catalyst.

11. In a process for the catalytic production of oxygenated organic compounds from a reaction mixture comprising carbon monoxide and the vapors of aliphatic compounds, the step of passing, intermittently with said reaction mixture, a gas containing at least 75% hydrogen in contact with the oxidic catalyst mass employed for the catalytic process at temperatures and pressures not substantially higher than those employed for the catalytic process, for the purpose of reactivating the catalyst.

12. In a process for the catalytic production of oxygenated organic compounds from a reaction mixture comprising carbon monoxide and the vapors of aliphatic alcohols, the step of passing, intermittently with said reaction mixture, a gas containing at least 75% hydrogen in contact with the oxidic catalyst mass employed for the catalytic process at temperatures and pressures not substantially higher than those employed for the catalytic process, for the purpose of reactivating the catalyst.

13. In a process for the catalytic production of oxygenated organic compounds from a reaction mixture comprising carbon monoxide and the vapors of aliphatic alcohols whose hydroxyl hydrogen has been replaced by an alkyl or an acyl group, the step of passing, intermittently with said reaction mixture, a gas containing at least 75% hydrogen in contact with the oxidic catalyst mass employed for the catalytic process at temperatures and pressures not substantially higher than those employed for the catalytic process, for the purpose of reactivating the catalyst.

WALTER BADER.
EDWARD BOADEN THOMAS.